(12) United States Patent
Nevalainen et al.

(10) Patent No.: US 10,011,096 B2
(45) Date of Patent: Jul. 3, 2018

(54) METHOD FOR MANUFACTURING A PACKAGING MATERIAL

(71) Applicant: Stora Enso OYJ, Helsinki (FI)

(72) Inventors: Kimmo Nevalainen, Kotka (FI); Ville Ribu, Laapeenranta (FI)

(73) Assignee: Stora Enso OYJ, Helsinki, FL (US)

( * ) Notice: Subject to any disclaimer, the term of this patent is extended or adjusted under 35 U.S.C. 154(b) by 329 days.

(21) Appl. No.: 14/646,565

(22) PCT Filed: Nov. 13, 2013

(86) PCT No.: PCT/IB2013/060098
§ 371 (c)(1),
(2) Date: May 21, 2015

(87) PCT Pub. No.: WO2014/083466
PCT Pub. Date: Jun. 5, 2014

(65) Prior Publication Data
US 2015/0298438 A1    Oct. 22, 2015

Related U.S. Application Data

(60) Provisional application No. 61/731,759, filed on Nov. 30, 2012.

(30) Foreign Application Priority Data

Apr. 15, 2013  (SE) ...................... 1300276

(51) Int. Cl.
*B32B 27/08*  (2006.01)
*B32B 27/10*  (2006.01)
(Continued)

(52) U.S. Cl.
CPC .......... *B32B 27/08* (2013.01); *A47G 19/2205* (2013.01); *B29C 47/025* (2013.01);
(Continued)

(58) Field of Classification Search
CPC ......... B32B 27/08; B32B 27/10; B32B 27/32; B32B 2270/00; B32B 2307/7246;
(Continued)

(56) References Cited

U.S. PATENT DOCUMENTS 5,035,941 A    7/1991  Blackburn
5,196,269 A    3/1993  Kittrell et al.
(Continued)

FOREIGN PATENT DOCUMENTS

EP    0107076    5/1984
EP    0336727    10/1989
(Continued)

OTHER PUBLICATIONS

International Searching Authority, International Search Report, PCT/IB2015/051268, dated Aug. 27, 2015.
(Continued)

*Primary Examiner* — Michael C Miggins
(74) *Attorney, Agent, or Firm* — Greer, Burns & Crain, LTD

(57) ABSTRACT

The invention relates to a polymer-coated packaging material, a method of manufacturing the same, and products, such as a disposable drinking cup, made from the material. The packaging material comprises a fibrous base (1) of paper or board, an innermost polymer layer (2) containing a blend of (i) 10 to 25 wt-% of a low-density polyethylene (LDPE) and (ii) 75 to 90 wt-% of a second polyethylene with a higher melt viscosity, said second polyethylene being selected from linear low-density polyethylene (LLDPE) and high-density polyethylene (HDPE), and an outer layer (3) of more than 90 wt-% of HDPE. An outermost layer (4) of a polymer blend similar to that used for the innermost layer (2) may be provided for heat-sealing. The layers (2, 3 and 4) may be brought and adhered to the fibrous base (1) by coextrusion.
(Continued)

To maximize renewability of the materials HDPE and LLDPE as used for the structure are of biologic origin.

21 Claims, 1 Drawing Sheet

(51) Int. Cl.
| | |
|---|---|
| *B32B 27/32* | (2006.01) |
| *A47G 19/22* | (2006.01) |
| *B29C 47/02* | (2006.01) |
| *B29C 47/06* | (2006.01) |
| *B32B 37/15* | (2006.01) |
| *B32B 27/12* | (2006.01) |
| *B29C 47/00* | (2006.01) |
| *B29K 23/00* | (2006.01) |
| *B29K 105/00* | (2006.01) |
| *B29K 711/12* | (2006.01) |

(52) U.S. Cl.
CPC ............ *B29C 47/065* (2013.01); *B32B 27/10* (2013.01); *B32B 27/12* (2013.01); *B32B 27/32* (2013.01); *B32B 37/153* (2013.01); *A47G 2400/10* (2013.01); *B29C 47/0004* (2013.01); *B29K 2023/065* (2013.01); *B29K 2023/0625* (2013.01); *B29K 2023/0633* (2013.01); *B29K 2105/0088* (2013.01); *B29K 2711/12* (2013.01); *B32B 2270/00* (2013.01); *B32B 2307/31* (2013.01); *B32B 2307/718* (2013.01); *B32B 2307/7163* (2013.01); *B32B 2307/7246* (2013.01); *B32B 2317/12* (2013.01); *B32B 2439/70* (2013.01)

(58) Field of Classification Search
CPC ............ B32B 2439/70; B32B 2307/31; B32B 2307/718; B32B 37/153; B32B 2317/12; B32B 27/12; B32B 2307/7163; A47G 19/2205; A47G 2400/10; B29C 47/0004; B29C 47/025; B29C 47/065; B29K 2023/0625; B29K 2023/0633; B29K 2023/065; B29K 2105/0088; B29K 2711/12; B29L 2031/712; B29L 2031/7132

See application file for complete search history.

(56) References Cited

U.S. PATENT DOCUMENTS

| | | | |
|---|---|---|---|
| 5,674,342 | A | 10/1997 | Obijeski |
| 7,335,409 | B2 | 2/2008 | Penttinen et al. |
| 2003/0145938 | A1 | 8/2003 | Mortellite et al. |
| 2005/0238901 | A1 | 10/2005 | Dalgleish |
| 2010/0047599 | A1 | 2/2010 | Kvamme et al. |
| 2010/0316869 | A1 | 12/2010 | Shelley et al. |
| 2011/0248076 | A1 | 10/2011 | Bentmar et al. |
| 2011/0274892 | A1 | 11/2011 | Chang et al. |
| 2012/0207954 | A1 | 8/2012 | Dalpe et al. |

FOREIGN PATENT DOCUMENTS

| | | |
|---|---|---|
| GB | 2323812 | 10/1998 |
| JP | H09142455 | 6/1997 |
| WO | 2000011075 | 3/2000 |
| WO | 20010119592 | 3/2001 |
| WO | 2010098856 | 9/2010 |
| WO | 2011004001 | 1/2011 |
| WO | 2013074287 | 5/2013 |

OTHER PUBLICATIONS

United States Patent and Trademark Office, Non-Final Office Action, U.S. Appl. No. 15/119,482, dated Feb. 5, 2018.

Second Office Action for corresponding Chinese Patent Application No. 201380060875.4, dated Dec. 27, 2016.

METHOD FOR MANUFACTURING A PACKAGING MATERIAL

This application is a U.S. National Phase under 35 U.S.C. § 371 of International Application No. PCT/IB2013/060098, filed Nov. 13, 2013, which claims priority under 35 U.S.C. §§ 119 and 365 to Swedish Application No. 1300276-1, filed Apr. 15, 2013 and U.S. Provisional Application 61/731,759, filed Nov. 30, 2012.

FIELD OF INVENTION

The invention relates to a method for manufacturing a packaging material, in which polymer coating layers are extruded onto a fibrous base, such as paper, paperboard or cardboard. Further, the invention relates to a polymer-coated packaging material provided by the method, as well as a disposable drinking cup and other products made from the material.

BACKGROUND OF THE INVENTION

Fibre-based packaging materials for containers and product packages, such as packaging paper or board, are usually provided with a polymeric coating that makes the material liquid-tight and allows forming the container or package by heat sealing. Typical articles made from polymer coated paper or board are liquid packages and disposable tableware, such as drinking cups. LDPE (low-density polyethylene) is widely used for coating due to its good heat-sealability.

Recently there has been a growing demand on the market for such paper or board products made solely or at least predominantly of raw-materials from renewable sources, i.e. raw-materials of biologic origin. Traditionally polyethylenes have been produced from fossil raw materials such as petroleum. More recently polyethylenes made from sugarcane, sugar beet or wheat grain have been developed, especially bio-LLDPE (linear low-density polyethylene) and bio-HDPE (high-density polyethylene) having easy availability. Also bio-LDPE, i.e. usual low-density polyethylene with a branched structure, is known but has limited supply and accordingly a high price. All these new polymer products have so far been tailored for the manufacture of polymer films, and their suitability to extrusion coating has been found to be poor.

HDPE in general has an advantage over LDPE or LLDPE in providing a superior water vapour barrier, which is very desirable in liquid containers and packages. On the other hand HDPE has a poor heat-sealability due to its higher melting temperature as compared to LDPE, and even its adhesivity in direct contact to a fibrous base is deficient. Furthermore, pure HDPE is not suitable for monolayer extrusion coating due to its narrow molecular weight distribution (MWD). Pure HDPE has a high neck-in and poor runnability in extrusion coating, when producing thin coatings of a coating weight of 15 to 25 g/m².

Multilayer coatings co-extruded onto a fibrous base are widely applied for fulfilling multiple goals such as water vapour barrier, oxygen and aroma barrier, adhesivity, heat-sealability etc. In the prior art, see e.g. U.S. Pat. No. 7,335,409, a combination of an inner HDPE layer and an outer LDPE layer has been described as providing a water vapour barrier and heat-sealability. However, adhesivity of such combination to a fibrous base is insufficient, and the present poor availability of bio-grade LDPE is another handicap from the environmental point of view.

SUMMARY OF THE INVENTION

There is thus a need for a process that allows technically effective and cost-efficient use of polyethylenes of biologic origin (particularly the film grade polyethylenes readily available on the present-day market) for extrusion coating onto a fibrous base. The solution should make possible an increased use of bio-HDPE so as to achieve by simple means an improved water vapour barrier in the paper or board product. At the same time the goal is to reduce the coating layer weights to as low as possible.

The approach of the present inventors to solve the problem is blending of different kinds of polyethylene products. More specifically, a superior polymer coating has surprisingly been achieved by coextrusion onto a fibrous base an inner polymer layer containing a blend of (i) 10 to 25 wt-% of a low-density polyethylene (LDPE) and (ii) 75 to 90 wt-% of a second polyethylene with a higher melt viscosity, said second polyethylene being selected from linear low-density polyethylene (LLDPE) and high-density polyethylene (HDPE), and an outer layer of more than 90 wt-% of HDPE.

As such blending of different kinds of polyethylenes is commonplace, and a multitude of such recipes may be found in the literature. However, those teachings mainly aim at making polymer films, not coatings onto a fibrous base, and thus tell nothing about adhesivity of such blends to a fibrous base as is an important aspect of the present invention. Furthermore, minor amounts of LLDPE or HDPE are usually described as being blended with a major share of usual branched LDPE, not the reverse as taught by the present inventors.

The structure according to the invention overcomes the neck-in and runnability problems of HDPE in extrusion and, as a double-layer structure, allows improved adhesion to the fibrous base. A layer of the polymer blend as described above is co-extruded as an inner layer between an outer layer of more than 90 wt-% of HDPE and the fibrous base.

Preferably said inner polymer layer contains a blend of (i) 10 to 25 wt-% of a low-density polyethylene (LDPE) having a melt index of at least 7.5 g/10 min (190° C., 2.16 kg), or even more preferably a melt index of at least 15 g/10 min (190° C., 2.16 kg) and (ii) 75 to 90 wt-% of a second polyethylene of biologic origin and having a melt index of at most 7.2 g/10 min (190° C., 2.16 kg), said second polyethylene being selected from linear low-density polyethylene (bio-LLDPE) and high-density polyethylene (bio-HDPE).

The outer vapour barrier layer can be of 100% HDPE, even though less than 10 wt-% of other polymers may be included if desired.

The invention thus provides a coating layer of said polymer blend, which can serve as an adhesive layer in direct contact with the fibrous base. At the same time a similar polymer blend layer may also be arranged as an outermost heat-sealing layer as the packaging material is formed into containers or closed product packages. The vapour barrier HDPE layer would be sandwiched between the two polymer blend layers. The major share of the biopolymers turns the product predominantly renewable-based even if the minor share of LDPE were of petroleum-origin.

According to an advantageous embodiment of the invention an innermost adhesive layer of the blend of LDPE and bio-LLDPE or the blend of LDPE and bio-HDPE, a middle layer of HDPE, and an outermost heat-sealable layer of such blend are coextruded at a single step onto the fibrous base. Preferably the same blend is used for both the innermost and the outermost polymer layer. The structure may consist of the innermost, the middle and the outermost polymer layers on the fibrous base, or there may be further polymer layers, such as an oxygen barrier layer e.g. of EVOH or polyamide sandwiched between said innermost and outermost polymer blend layers.

HDPE, whenever used in the structures according to the invention, is preferably of biologic origin, i.e. also in a middle all-HDPE layer.

Preferred embodiments of the invention provide that said polymer blend contains within the range of 80 to 90 wt-%, or 80 to 85 wt-%, of LLDPE or HDPE of biologic origin and within the range of 10 to 20 wt-%, or 15 to 20 wt-% of ordinary branched LDPE.

Further embodiments of the invention provide that the weight of an innermost adhesive layer of said blend is at most 15 g/m$^2$, preferably at most 10 g/m$^2$, and most preferably about 5 g/m$^2$, that the weight of an outermost heat-seal layer of said blend is at most 15 g/m$^2$, preferably at most 10 g/m$^2$, and most preferably about 5 g/m$^2$, and that the weight of a middle HDPE layer is at most 15 g/m$^2$, preferably at most 10 g/m$^2$, and most preferably about 5 g/m$^2$. Preferably in a triple-layer coating the total weight of the polymer layers is at most 25 g/m$^2$, preferably at most 20 g/m$^2$, and most preferably about 15 g/m$^2$. Very thin multiple polymer layer structures are thus made possible by the invention.

Reducing the coating layer weights even further would be desirable from economic and environmental points of view. Within the scope of the invention, triple layers with respective coating layer weights of 4+4+4 g/m$^2$ or even 4+2+4 g/m$^2$ could be contemplated, if made possible by existing coextrusion techniques.

The invention further covers packaging materials, which are obtainable by the method according to the invention as claimed.

Preferably a packaging material according to the invention comprises:
a fibrous base of paper, paperboard or cardboard,
an innermost adhesive layer of a blend of (i) 10 to 25 wt-% of a low-density polyethylene (LDPE) having a melt index of at least 7.5 g/10 min (190° C., 2.16 kg), or more preferably of at least 15 g/10 min (190° C., 2.16 kg) and (ii) 75 to 90 wt-% of a second polyethylene of bio-logic origin and having a melt index of at most 7.2 g/10 min (190° C., 2.16 kg), said second polyethylene being selected from linear low-density polyethylene (LLDPE) and high-density polyethylene (HDPE).
a middle layer of HDPE of biologic origin, and
an outermost heat-sealable layer of a blend of (i) 10 to 25 wt-% of a low-density polyethylene (LDPE) having a melt index of at least 7.5 g/10 min (190° C., 2.16 kg) or more preferably of at least 15 g/10 min (190° C., 2.16 kg) and (ii) 75 to 90 wt-% of a second polyethylene of bio-logic origin and having a melt index of at most 7.2 g/10 min (190° C., 2.16 kg), said second polyethylene being selected from linear low-density polyethylene (LLDPE) and high-density polyethylene (HDPE),
said layers having been brought by coextrusion onto said fibrous base.

Preferably the packaging material according to the invention is coated with polymer layers similarly on both sides.

The final products included in the scope of the invention include a drinking cup made by heat-sealing from the packaging material as described above. Other articles covered by the invention are disposable plates, trays and other tableware, as well as sealed liquid packages such as dairy product and juice cartons, where further oxygen and light barrier layers may be desirable.

In connection with the invention, high-density polyethylene refers to polyethylenes with a density of more than 0.940 g/cm$^3$.

The invention is especially suitable for the production of materials for packaging of food, especially frozen food, but is not limited to this application.

DETAILED DESCRIPTION

Figure 1:
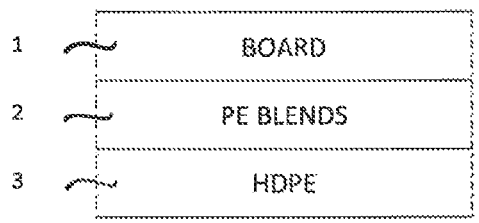
FIG. 1 shows the multilayer structure of a packaging material according to the invention.

The packaging material shown in FIG. 1 comprises a fibrous base 1, an inner adhesive layer 2 in direct contact with the fibrous base 1, the adhesive layer 2 comprising a blend of (i) 10 to 25 wt-% of a low-density polyethylene (LDPE) of a lower melt viscosity and (ii) 75 to 90 wt-% of a second polyethylene of a higher melt viscosity, and an outer layer 3 of HDPE. In the blend forming the inner adhesive layer 2 the low-density polyethylene (LDPE) preferably has a melt index of at least 7.5 g/10 min (190° C., 2.16 kg), or more preferably of at least 15 g/10 min (190° C., 2.16 kg), and the second polyethylene preferably has a melt index of at most 7.2 g/10 min (190° C., 2.16 kg). The second polyethylene may be linear low-density polyethylene (LLDPE) or high-density polyethylene (HDPE). HDPE and LLDPE as used in the structure are of renewable biologic origin. The fibrous base 1 may be paper, paperboard or cardboard of a weight of 40 to 500 g/m$^2$, preferably board of a weight of 170 to 350 g/m$^2$. The inner adhesive layer 2 and the outer HDPE layer 3 have been brought onto the fibrous base 1 by coextrusion. The weight of each one of the coextruded polymer layers 2, 3 may be e.g. 3 to 15 g/m$^2$, preferably 5 to 10 g/m$^2$.

Figure 2:
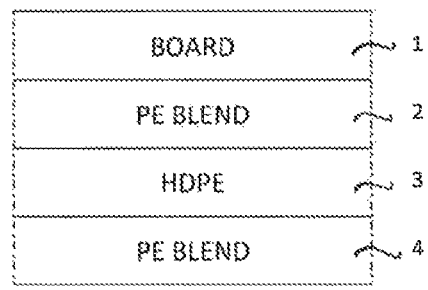
FIG. 2 shows the multilayer structure of a second packaging material according to the invention.

The packaging material according to FIG. 2 differs from the material shown in FIG. 1 in that it even comprises an outermost layer 4 of a polymer blend, which is similar to, preferably the same as the blend used for the innermost adhesive layer 2. The outermost layer 4 is useful as a heat-sealing layer as the material is turned into containers such as disposable drinking cups for instance. The three layers 2, 3, 4 have been brought onto the fibrous base 1 by coextrusion.

The weight of each one of the coextruded polymer layers 2, 3, 4 may be e.g. 3 to 12 g/m$^2$, preferably 5 to 10 g/m$^2$.

Figure 3:
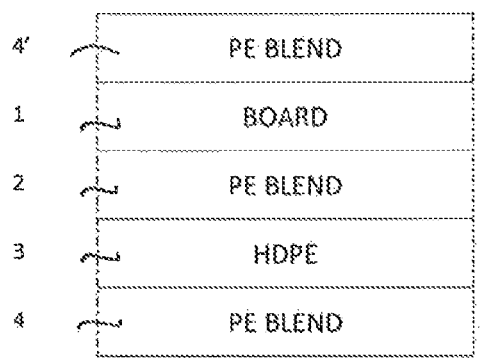
FIG. 3 shows the multilayer structure of a third packaging material according to the invention.

The packaging material according to FIG. 3 differs from the material shown in FIG. 2 in that it even comprises a heat-sealing layer 4' on the opposite side of the fibrous base 1. Preferably this heat-sealing layer 4' is of a polymer blend, which is the same as the blend used for the innermost and outermost layers 2, 4 on the reverse side of the fibrous base, the latter forming the inside as the material is turned into a drinking cup.

Figure 4:
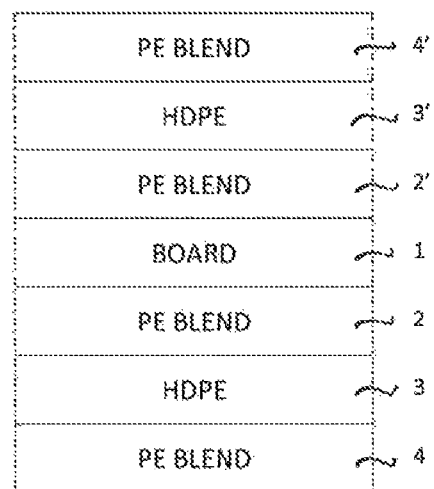
FIG. 4 shows the multilayer structure of a fourth packaging material according to the invention.

The packaging material according to FIG. 4 comprises a coextruded multilayer structure 2, 3, 4; 2', 3', 4' on both sides of the fibrous base 1. These multilayer structures may both correspond to that described above in connection with FIG. 2. The material of FIG. 4 is suitable for heat-sealed product packages shielded against water vapour penetration from both the inside of the package, i.e from a moist product, and from the outside of the package, i.e. from humid ambience.

Examples 20 wt-% of extrusion grade LDPE of petroleum oil origin was dry blended with film grade bio-HDPE of sugar cane origin to form a polymer blend. This polymer blend was co-extruded together with 100 wt-% bio-HDPE onto a paperboard surface so that the polymer blend formed an adhesion layer in-between the paperboard surface and the HDPE layer. The grammage of the adhesion layer was 8 g/m² and the grammage of HDPE layer was 7 g/m². So, in total coating, there was 1.6 g/m² LDPE and 13.4 g/m² HDPE. Coating weight of 15 g/m² was achieved with good runnability, acceptable neck-in and good adhesion to the paperboard.

A series of tests were carried out by extruding onto a paperboard base double or triple layer coatings according to the invention, as well as monolayer coatings as comparative examples. Extrusion grade oil-based LDPE, film grade bio-HDPE, and film grade bio-LLDPE (bio-HDPE and bio-LLDPE made from sugar cane by Braskem, Brazil) were used for the tests. The neck-in in extrusion and heat-sealing temperature of the finished material were measured, and adhesion to the board base was evaluated on a scale 1 (no adhesion) to 5 (perfect adhesion). The results are presented in the following table 1.

TABLE 1

| Structure | g/m² | Thicknesses (µm) | Heat sealing (° C.) | Adhesion (0-5) | Neck-in (mm) |
|---|---|---|---|---|---|
| Board/LDPE* | 15 | 15 | 360 | 5 | 60 |
| Board/LLDPE + 20% LDPE* | 15 | 15 | 440 | 5 | 90 |
| Board/LLDPE + 20% LDPE/HDPE/LLDPE + 20% LDPE | 15 | 5/5/5 | 440 | 5 | 90 |
| Board/LLDPE + 20% LDPE/HDPE/LLDPE + 20% LDPE | 20 | 5/10/5 | 430 | 5 | 90 |
| Board/HDPE + 20% LDPE/HDPE/HDPE + 20% LDPE | 15 | 5/5/5 | 510 | 5 | 85 |
| Board/HDPE + 20% LDPE/HDPE/HDPE + 20% LDPE | 20 | 5/10/5 | 510 | 5 | 85 |
| Board/HDPE + 20% LDPE/HDPE | 15 | 10/5 | 490 | 5 | 85 |
| Board/HDPE* | 25 | 25 | 500 | 3.5 | 110 |

*comparative

The comparative HDPE monolayer coating had the worst neck-in and adhesion in spite of the largest layer thickness. Thinner HDPE monolayers failed in extrusion altogether. Adding an inner layer of a blend of LLDPE or HDPE with 20 wt-% of LDPE improved adhesion and diminished the neck-in, even though the total coating weights and thicknesses were reduced, and by addition of an outermost layer of the same blends considerably improved heat-sealability in case of LLDPE+LDPE.

The invention claimed is:

1. A method of manufacturing a packaging material, comprising coextrusion onto a fibrous base an inner polymer layer containing a blend of (i) 10 to 25 wt-% of a low-density polyethylene (LDPE) and (ii) 75 to 90 wt-% of a second polyethylene with a higher melt viscosity, said second polyethylene being selected from linear low-density polyethylene (LLDPE) and high-density polyethylene (HDPE), and an outer layer of more than 90 wt-% of HDPE.

2. The method of claim 1, wherein at least one of the HDPE and LLDPE as used for the structure are of biologic origin.

3. The method of claim 1 wherein in said blend the low-density polyethylene (LDPE) has a melt index of at least 7.5 g/10 min (190° C., 2.16 kg) and said second polyethylene has a melt index of at most 7.2 g/10 min (190° C., 2.16 kg).

4. The method of claim 1 wherein the inner polymer layer of said blend is an adhesive layer in direct contact with the fibrous base.

5. The method of claim 1 wherein there is a layer of said blend coextruded as an outermost heat-sealable layer.

6. The method of claim 4 wherein there is a layer of said blend coextruded as an outermost heat-sealable layer, and wherein the same blend is used for the inner adhesive layer and the outermost heat-seal layer.

7. The method of claim 1 wherein said polymer blend contains at least 80 wt % of LLDPE or HDPE of biologic origin and 10 to 20 wt-% of LDPE.

8. The method of claim 1 wherein the weight of the inner adhesive layer is at most 15 g/m².

9. The method of claim 1 wherein the weight of the outermost heat-seal layer is at most 15 g/m².

10. The method of claim 1 wherein the weight of said outer HDPE layer is at most 15 g/m².

11. A packaging material made by the method of claim 1.

12. A drinking cup made by heat-sealing from the packaging material made by the method of claim 1.

13. The method of claim 1 wherein said polymer blend contains 80 to 85 wt-% of LLDPE or HDPE of biologic origin and 15 to 20 wt-% of LDPE.

14. The method of claim 1 wherein the weight of the inner adhesive layer is at most 10 g/m².

15. The method of claim 1 wherein the weight of the outermost heat-seal layer is at most 10 g/m².

16. The method of claim 1 wherein the weight of said outer HDPE layer is at most 10 g/m².

17. A packaging material comprising
(i) a fibrous base of paper or board,
(ii) an innermost adhesive layer of a blend of (i) 10 to 25 wt-% of a low-density polyethylene (LDPE) and (ii) 75 to 90 wt-% of a second polyethylene with a higher melt viscosity, said second polyethylene being of biologic origin and selected from linear low-density polyethylene (LLDPE) and high-density polyethylene (HDPE),
(iii) a middle layer of more than 90 wt-% of HDPE of biologic origin, and
(iv) an outermost heat-sealable layer of a blend of (i) 10 to 25 wt-% of a low-density polyethylene (LDPE) and (ii) 75 to 90 wt-% of a second polyethylene with a higher melt viscosity, said second polyethylene being of biologic origin and selected from linear low-density polyethylene (LLDPE) and high-density polyethylene (HDPE),
said layers having been brought by coextrusion onto said fibrous base.

18. The packaging material of claim 17, wherein the same blend is contained in said innermost and outermost polymer layers.

19. The packaging material of claim 17 wherein the weight of each one of the innermost, middle and outermost polymer layers is at most 15 g/m$^2$.

20. The packaging material of claim 17, wherein the fibrous base is coated with polymer layers similarly on both sides.

21. The packaging material of claim 17 wherein the weight of each one of the innermost, middle and outermost polymer layers is at most 10 g/m$^2$ and the total weight of the polymer layers is at most 20 g/m$^2$.

* * * * *